United States Patent
Head et al.

(10) Patent No.: US 10,340,779 B2
(45) Date of Patent: *Jul. 2, 2019

(54) LINE START PERMANENT MAGNET MOTOR USING A MODULAR ROTOR

(71) Applicant: COREteQ Systems Ltd., Bagshot (GB)

(72) Inventors: Philip Head, Surry (GB); Hassan Mansir, Maidenhead (GB)

(73) Assignee: Coreteq Systems Ltd., Surrey (GB)

( * ) Notice: Subject to any disclaimer, the term of this patent is extended or adjusted under 35 U.S.C. 154(b) by 200 days.

This patent is subject to a terminal disclaimer.

(21) Appl. No.: 15/036,147

(22) PCT Filed: Nov. 17, 2014

(86) PCT No.: PCT/EP2014/074803
§ 371 (c)(1),
(2) Date: May 12, 2016

(87) PCT Pub. No.: WO2015/071468
PCT Pub. Date: May 21, 2015

(65) Prior Publication Data
US 2016/0294268 A1    Oct. 6, 2016

(30) Foreign Application Priority Data
Nov. 15, 2013 (GB) .................................. 1320246.0

(51) Int. Cl.
H02K 21/46    (2006.01)
H02K 21/14    (2006.01)
(Continued)

(52) U.S. Cl.
CPC ............. *H02K 21/46* (2013.01); *H02K 5/132* (2013.01); *H02K 7/003* (2013.01); *H02K 7/20* (2013.01); *H02K 16/00* (2013.01); *H02K 17/16* (2013.01); *H02K 21/14* (2013.01)

(58) Field of Classification Search
CPC ......... H02K 1/276; H02K 7/003; H02K 21/46
See application file for complete search history.

(56) References Cited

U.S. PATENT DOCUMENTS 1,469,304 A    10/1923    Hughes
1,960,484 A    5/1934    Ekstromer
(Continued)

FOREIGN PATENT DOCUMENTS

CN    101227127 A1    7/2008
CN    101873043 A    10/2010
(Continued)

OTHER PUBLICATIONS

G2 Consult: "Theory & Practice of Electromagnetic Design of DC Motors & Actuators", Internet, Nov. 16, 2012, retrieved from the Internet Jan. 22, 2016: URL: https://web.archive.org/web/20120116070129/http://www.consult-g2.com/course/chapter8/chapter.html ; 5 pgs.

(Continued)

*Primary Examiner* — Dang D Le
(74) *Attorney, Agent, or Firm* — Fay Sharpe LLP (57) ABSTRACT

A rotor system for a downhole motor includes at least one permanent magnet rotor section, and at least one squirrel cage rotor section. The permanent magnet rotor section and the squirrel cage rotor section are joined in series by a connection. In one example the connection includes a male self lock taper on one rotor, and a corresponding female self lock taper on the other rotor.

13 Claims, 7 Drawing Sheets

(51) Int. Cl.
  *H02K 5/132* (2006.01)
  *H02K 7/00* (2006.01)
  *H02K 7/20* (2006.01)
  *H02K 16/00* (2006.01)
  *H02K 17/16* (2006.01)

(56) References Cited

U.S. PATENT DOCUMENTS

| | | | |
|---|---|---|---|
| 2,240,569 A | | 5/1941 | Myers |
| 2,531,120 A | * | 11/1950 | Feaster ............... E21B 4/04 173/79 |
| 5,682,074 A | | 10/1997 | Di Pietro et al. |
| 6,384,507 B1 | * | 5/2002 | Lee ................. H02K 7/088 310/211 |
| 2002/0066568 A1 | | 6/2002 | Buchanan |
| 2002/0079763 A1 | | 6/2002 | Fleshman et al. |
| 2009/0184598 A1 | | 7/2009 | Nakano |
| 2011/0316468 A1 | | 12/2011 | Makki et al. |
| 2015/0110642 A1 | * | 4/2015 | Dahouk ............. F04D 13/068 417/16 |

FOREIGN PATENT DOCUMENTS

| | | |
|---|---|---|
| DE | 102011120985 A1 | 6/2013 |
| EP | 2112748 A1 | 10/2009 |
| EP | 2573908 A2 | 3/2013 |
| GB | 2438493 A | 11/2007 |
| GB | 2501352 A | 10/2013 |
| JP | S57186966 A | 11/1982 |
| JP | H05 22916 A | 1/1993 |
| JP | H11 299144 A | 10/1999 |
| JP | 2009095193 A | 4/2009 |
| WO | WO2004027211 A1 | 4/2004 |
| WO | WO2015071465 A1 | 5/2015 |
| WO | WO2015071466 A2 | 5/2015 |
| WO | WO2015071469 A2 | 5/2015 |
| WO | WO2015071470 A1 | 5/2015 |

OTHER PUBLICATIONS

International Search Report and Written Opinion, PCT/EP2014/074803, Completed Jun. 1, 2015, dated Jun. 25, 2015, 12 pages.

* cited by examiner

FIG5

FIG6
SECTION CC

LINE START PERMANENT MAGNET MOTOR USING A MODULAR ROTOR

CROSS-REFERENCE TO RELATED APPLICATIONS

This application is a National Stage Entry of PCT/EP2014/074803, and claims priority to, and the benefit of, Great Britain Patent Application No. GB 1320246.0, filed Nov. 15, 2013, the entirety of which is hereby incorporated by reference as if fully set forth herein.

This invention relates to electric motors, and more particularly, to a permanent magnet motor and induction motor combination that is capable of self-starting when operated directly on line.

Permanent magnet motors are typically unable to operate without elaborate controls because they cannot be started when connected directly to the line. Thus, they typically employ rotor position transducers and control electronics in order to start. These components quite clearly add to both the cost and the complexity of the motor system, also in a wellbore environment they are more susceptible to damage and have to communicate with the controlled over a very long cable, which is both expensive because of the long cable but also introduces sometime delays due to the many thousands of feet between the motor controlled and the motor.

As one means of avoiding position transducers and control electronics, while providing for a direct on-line starting performance, squirrel cage rotors and magnets may be employed on a rotor surface, so that the rotor of the motor can be made in to include both the functions of an induction rotor this can then act as a starter, while the permanent magnets once synchronised provide the efficiencies and power density. US20020084710 shows such an arrangement.

The benefit of this combination is that the induction motor rotor portion is able to get the rotor turning in the correct direction and once the permanent magnet rotor portion is in synchronisation no power is absorbed by the induction motor and all the efficiency benefits of the permanent magnet motor are realised. However, such an arrangement is complex and bulky.

It is therefore the objective of this invention to have a rotor with combined induction rotor and permanent magnet rotor characteristics to start the system on line, or with a simple drive, in a convenient, compact and versatile arrangement.

As one means of avoiding position transducers and control electronics, while providing for a direct on-line starting performance, the rotor of the motor can be made in to include both the functions of a induction rotor this can then act as a starter, while the permanent magnets once synchronised provide the efficiencies and power density.

The benefit of this combination is that the induction motor rotor portion is able to get the rotor turning in the correct direction and once the permanent magnet rotor portion is in synchronisation no power is absorbed by the induction motor and all the efficiency benefits of the permanent magnet motor are realised.

It is therefore the objective of this invention to have a rotor with combined induction rotor and permanent magnet rotor characteristics to start the system on line, or with a simple drive.

This arrangement motor into synchronous speed.

It is a further objective to maximise the efficiency of the permanent magnet motor to achieve maximum energy saving over an equivalent induction motor.

According to the present invention, there is provided a downhole motor comprising at least one permanent magnet rotor section, and at least one induction rotor section the permanent magnet rotor section and the induction rotor section being joined in series by a connection.

In this arrangement, the induction portion of a rotor is used to start a permanent magnet portion of a rotor. The permanent magnet motor once at speed will operate synchronous with the supply frequency. Once at synchronous speed the induction rotor portion will generate zero torque and consume minimum power.

If the permanent magnet rotor losses synchronisation, the induction portion of the rotor will generate torque and enable the system to regain synchronisation. The motor can be run on direct line. The motor can operate with a simple variable speed drive.

For long motors as used in the oil industry for submersible pumps it is advantageous both for cost and easy of manufacture to construct the rotor in short sections and connect together. It is also possible to make a hybrid rotor, combining features of an induction rotor and a permanent magnet rotor. The benefit of this combination is that the induction characteristics enable the rotor turning in the correct direction and once the permanent magnet characteristics are in synchronisation no power is absorbed by the induction rotor portion, thus all the efficiency benefits of the permanent magnet motor are realised, and none of the drawbacks and similarly, all the benefits of an induction motor are enjoyed again without the draw backs.

By way of example the following figures will be used to describe embodiments of the invention.

Figure 1:
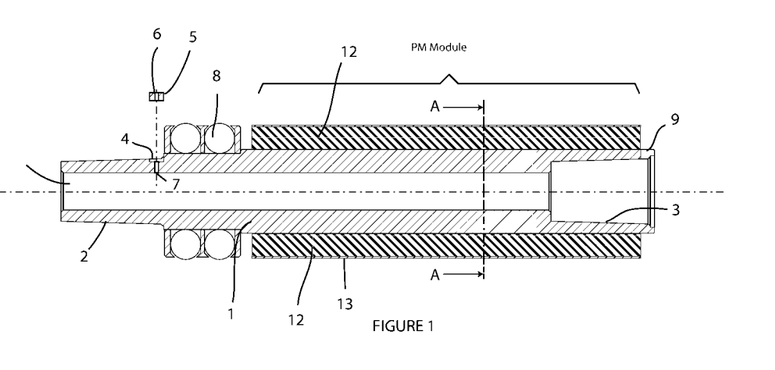
FIG. 1 is a section side view of a solid body rotor with permanent magnets mounted on flat surfaces encased in a non-magnetic outer sleeve.
Figure 2:
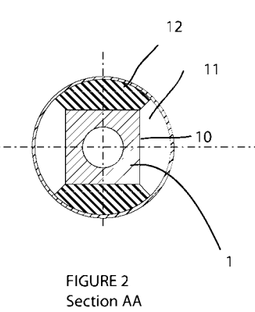
FIG. 2 is a end section view AA of the rotor shown in FIG. 1

Referring to FIGS. 1 and 2 there is shown a longitudinal section and cross section of a first module of rotor 26. The rotor shaft 1 at one end has a male Morse taper 2 and the other a female Morse taper 3. At the base of the male Morse taper 2 is a small countersunk hole 4 in which a small pin 5 is inserted, held by an interference fit. The rotor includes a central through bore 35. A small hole 6 in the pin 5 allows oil to flow from the inner bore 35 of the shaft 6 via a hole 7 in the shaft, to outside the shaft adjacent to the shaft bearing 8 to lubricate the rotor. The shaft bearing 8 is a hybrid type, employing ceramic balls which electrically isolate the shaft from the stator.

Several rotor modules 26 can be joined together, as will be described in more detail below. Adjacent rotor modules are similarly provided with male and female Morse tapers, so that each male Morse taper of one rotor module mates with the female Morse taper of an adjacent Morse taper. Morse tapers are cones are tapers with a low gradient, such that when male and female tapers are fitted together with sufficient force, the interference fit and friction between the surface secure the parts together, remaining joined even when some axial separation force is applied, and also a torsional locking. Tangs or splines could additionally be provided on one of the tapes, which corresponding features on the other taper, so that they can key together and increase the torsional transfer capabilities.

At the female Morse taper 3 end of the shaft 1 is a small slot 9 which is the same width as the diameter of the pin 5, as the shafts are pushed together this provides perfect shaft alignment, and additional torque transfer capability above that provided by the of the Morse taper.

During manufacture, flats 10 are machined onto the surface of the rotor shaft 1 to give it a square section, and north polarised magnets 11 (by convention the magnets are distinguished by the pole facing radially outwards) and south polarised magnets 12 are bonded to these surfaces. A thin wall outer steel tube 13 encases the magnets to retain the magnets when the shaft is rotating.

Figure 3:
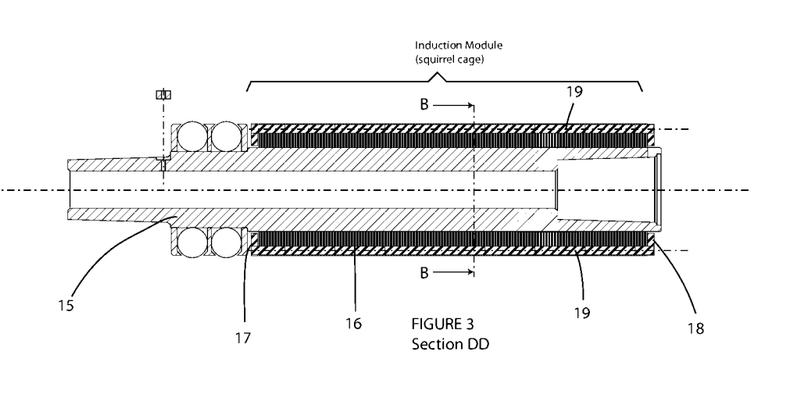
FIG. 3 is a section side view of a squirrel cage rotor, with copper rods inserted into laminations mounted on a hexangonal shaft. The copper rods terminated at each end by a copper ring.

Referring to FIG. 3 a second type of rotor 27 is shown. The rotor shaft 15 has a six sided section, laminations 16 having corresponding apertures are fitted over this shaft, and a copper ring (not shown) at each end of the lamination stack. Copper clad steel bars 19 pass through the lamination stack, and are welded to the copper end rings (not shown). This is provides a squirrel cage type arrangement.

An alternating current flowing in a stator winding (not shown) produces a magnetic field which rotates in relation to the stator. This magnetic field cuts or pierces the rotor construction in a transverse direction, perpendicular to the rotor axis. As the magnetic flux cuts the rotor construction, it induces during its rotation a voltage in the copper clad steel bars 19. This generates an electric current in the conductor of the rotor construction, this electric current in the rotating magnetic field applies a torque, and the rotor starts to rotate.

The squirrel cage acts to get the rotor turning, and when the permanent magnets get the rotor into synchronous speed with the rotating filed in the stator, no slip will be experienced by the squirrel cage and no torque will be generated.

Figure 6:
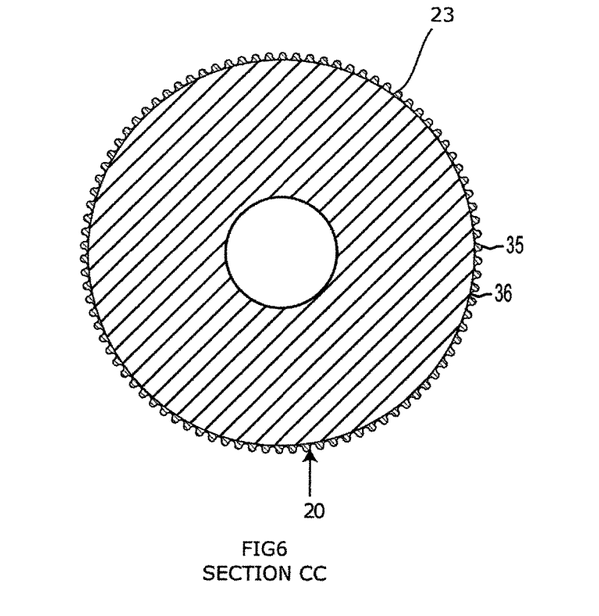
FIG. 6 is a section end view CC of the rotor shown in FIG. 5. The changing thickness of the outer copper surface clearly visible.
Figure 7:
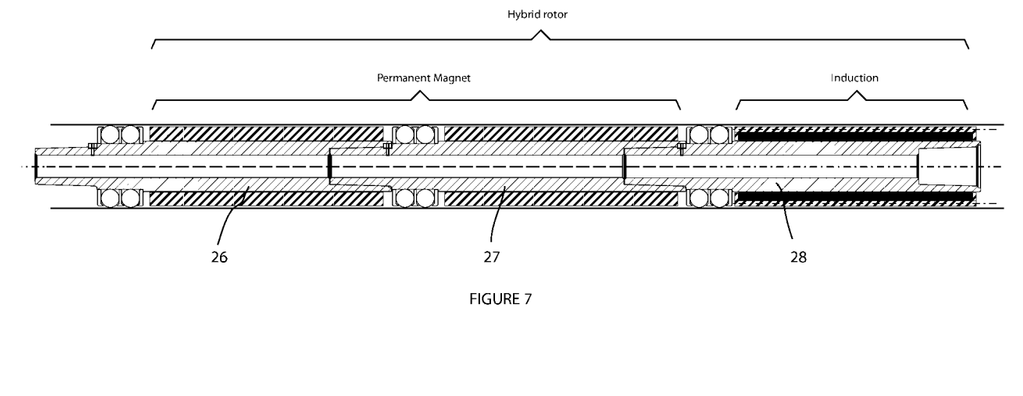
FIG. 7 is a section side view of more than one modular rotor, connected together to form a single rotor, but with a hybrid characteristic in that it combines both induction and permanent magnet in its construction.

Referring to FIGS. 6 and 7, another rotor module 20 has an outer surface 23 composed of copper, which is longitudinally fluted or undulating, alternating from a thick section or peak 35 to a thin section or through 36. This is achieved by cold drawing the rotor through a die which has the undulating profile around the full 360 degree circumference of the rotor.

Figure 4:
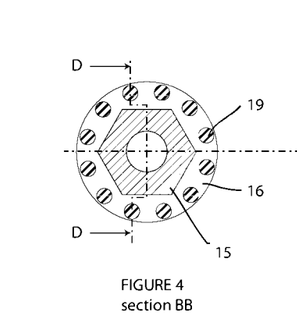
FIG. 4 is a section end view DD of FIG. 3
Figure 5:
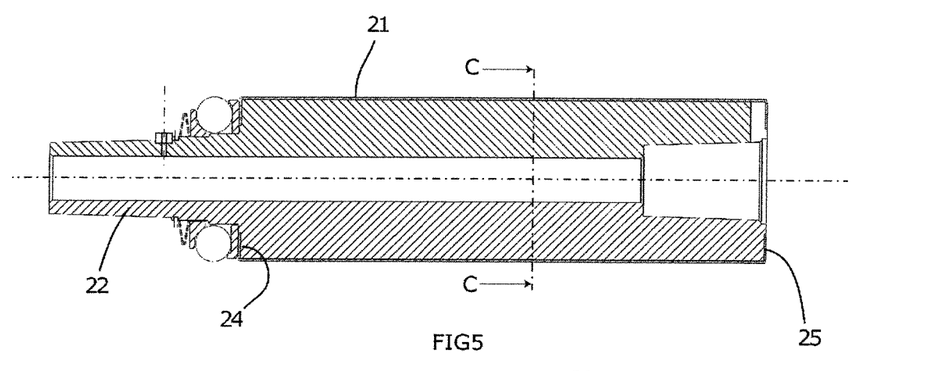
FIG. 5 is a section side view of a solid rotor with a copper outer surface, changing in thickness from thick to thin around the entire outer surface of the rotor.

As in the embodiment shown in FIGS. 3 and 4, a stator winding (not shown) produces a rotating magnetic field, which transversely cuts the rotor.

The fluted, corrugated or rippled outer conductive layer 21 meets end edge members 24 and 25, which acts to short circuit the outer conductive circuit. The fluting acts in a similar way to longitudinal conductors, the thin sections offering a relatively high resistance and inhibiting radial current. In effect this operates in the same way as the squirrel cage, the key difference being a far simpler and cost effective construction.

The electric current generated in the outer surface in the rotating magnetic field applies a torque to the rotor and causes it to turn.

Two general types of rotor modules are provided then, a first type having permanent magnets fixed around the rotor, and a second type having a squirrel cage arrangement where current is induced in the rotor. Referring to FIG. 7, these two types of rotor, and corresponding stators, can then arranged linearly arranged, conveniently fixed together using the male and female Morse tapers provided at the rotor ends. This gives a convenient and radially compact arrangement. Shown here, two permanent magnet rotors of the first type are attached together, followed by a squirrel cage rotor or second type. However, there is a great deal of freedom to arrange the modules according to the requirements, and they may be alternately arranged, or grouped as convenient, or even deployed singly.

Figure 8:
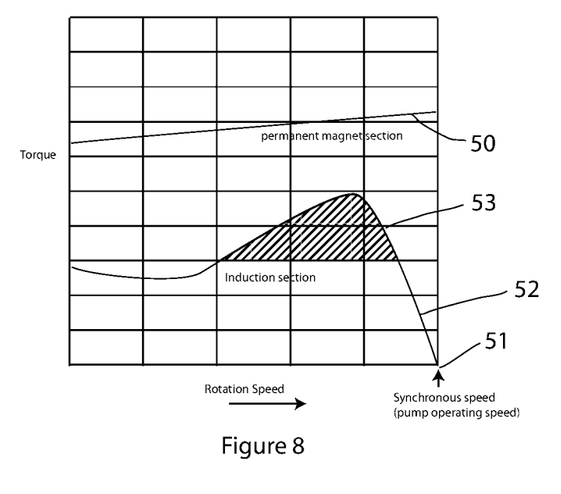
FIG. 8 is a graph with both the pmm and induction motor torque characteristics shown.

Referring to FIG. 8, the torque 52 provided by the squirrel cage initiates rotation and generally increases with increasing rotation, until the rotation speed of the rotor approaches the rotation of the magnetic field, and the induced current reduces to zero whether the rotor is synchronised with the magnetic field. The torque provided by the permanent magnet now solely provides the torque for the rotor operation.

Figure 9:
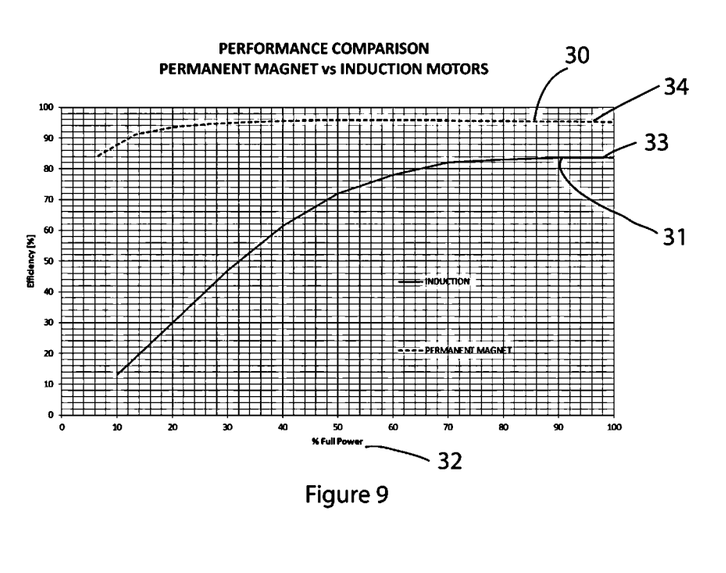
FIG. 9 is a graph showing the efficiency characteristics of a pmm and induction motor along their entire speed range.
Figure 10:
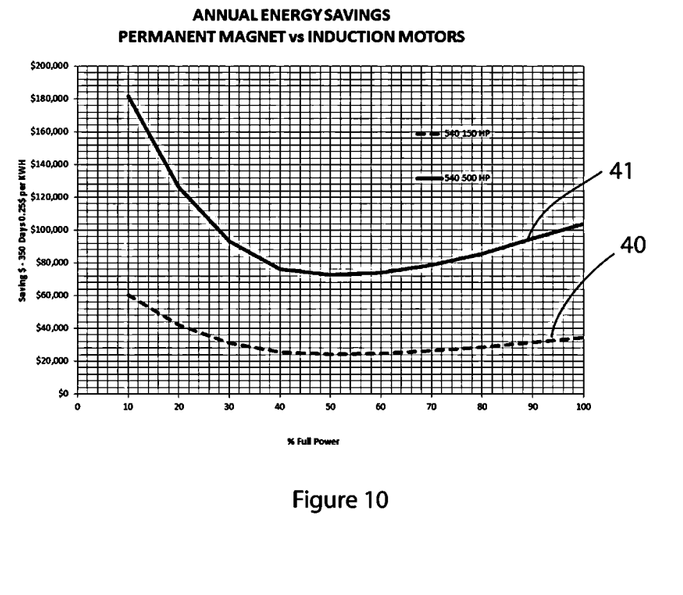
FIG. 10 is a graph using the characteristics from FIG. 9 to show the annual electric savings for two motor sizes and electricity cost of 0.25$/kwh.

Referring to FIGS. 9 and 10, a permanent magnet motor efficiency 30 is greater than that of a squirrel cage motor 31, particularly at low power. The use of permanent magnet motor represents a significant energy saving 40, which increases with the total motor power 41. A modular arrangement as herein described allows the efficiencies of a permanent magnet motor to be enjoyed to a great extent, while still benefitting from the efficient and convenient starting characteristics of a squirrel cage motor.

The embodiments discussed here show inductions rotors and permanent magnet rotors being modularity formed and connected together, conveniently using a Morse taper arrangement. While the modular nature of the rotors is convenient and adaptable, inductions rotors and permanent magnet rotors could be arranged in series (in various configurations) while mounted or formed on a common rotor to get the same control benefits.

The invention claimed is:

1. A method of operating a rotor system for a downhole motor comprising at least one permanent magnet rotor section, and at least one induction rotor section, the permanent magnet rotor section and the induction rotor section being joined in series by a connection, the method including using the induction rotor section to turn the permanent magnet rotor section until the permanent magnet rotor section is operating at synchronous speed.

2. A method of operating a rotor system according to claim 1 wherein the connection comprises a male self lock taper on one rotor, and a corresponding female self lock taper on the other rotor.

3. A method of operating a rotor system according to claim 1 wherein the connection includes a spline or key capable of transferring torque between rotors.

4. A method of operating a rotor system according to claim 1 wherein a through bore is included.

5. A method of operating an induction rotor according to claim 1 where the induction motor includes a conductive material substantially formed around a cylinder, the thickness of the conductive material varying around the radius of the cylinder in an alternating manner, so as to provide relatively thick portions that are generally axially aligned.

6. A method of operating a rotor system according to claim 5, wherein the induction motor is joined to a permanent magnet rotor in series by a connection.

7. A method of operating a rotor system according to claim 5 wherein the connection comprises a male self lock taper on one rotor, and a corresponding female self lock taper on another rotor.

8. A method of operating a rotor system according to claim 5 wherein there is included a connection between the permanent magnet rotor and the induction rotor, the connection includes a spline or key that transfers torque between the permanent magnet rotor and the induction rotors.

9. A method of operating a rotor system according to claim 1 wherein a through bore is included.

10. A method of operating a rotor system according to claim 1 wherein bearings are retained between the rotors.

11. A method of operating a rotor system for a downhole motor comprising at least one permanent magnet rotor section, and at least one induction rotor section the permanent magnet rotor section and the induction rotor section being mounted on a common shaft, including the step of using the induction rotor section to turn the permanent magnet rotor section until the permanent magnet rotor section is operating at synchronous speed.

12. A method of operating a rotor system according to claim 11 wherein a through bore is included.

13. A method of operating a rotor system according to claim 11 which includes a conductive material substantially formed around cylinder, the thickness of the conductive material varying around the radius of the cylinder in an alternating manner, so as to provide relatively thick portions that are generally axially aligned.

* * * * *